United States Patent [19]
Drechsler

[11] Patent Number: 5,557,043
[45] Date of Patent: Sep. 17, 1996

[54] APPARATUS FOR FIXING AN ADHESIVE BALANCING WEIGHT TO A VEHICLE WHEEL

[75] Inventor: Josef Drechsler, Pfungstadt, Germany

[73] Assignee: Hofmann Werkstatt-Technik GmbH, Germany

[21] Appl. No.: 434,768

[22] Filed: May 4, 1995

[30] Foreign Application Priority Data

May 5, 1994 [DE] Germany .................. 44 15 930.7

[51] Int. Cl.⁶ .................................................. B32B 31/00
[52] U.S. Cl. ............................. 73/468; 156/538; 156/75
[58] Field of Search ................... 73/468, 487; 156/75, 156/538, 349, 556

[56] References Cited

U.S. PATENT DOCUMENTS

| | | | |
|---|---|---|---|
| 4,687,536 | 8/1987 | Hiramatsu | 136/538 |
| 4,861,214 | 8/1989 | Sander | 73/487 |
| 4,903,398 | 2/1990 | Sakamoto | 73/468 |

FOREIGN PATENT DOCUMENTS

0519162A1 12/1992 European Pat. Off. .
1084494 6/1960 Germany .

Primary Examiner—Hezron E. Williams
Assistant Examiner—Christine K. Oda
Attorney, Agent, or Firm—Cushman Darby & Cushman, L.L.P.

[57] ABSTRACT

An apparatus for fixing a balancing weight having an adhesive layer thereon to a vehicle wheel at a balancing position comprises a holder having at least first and second holding portions for holding a balancing weight under a spring force. The holder is guided to a balancing position on the wheel by a guide so that an edge of the adhesive-bearing surface of the balancing weight is applied to or contacts the wheel at the desired balancing position. Pressure is then directed towards the balancing position and applied to the balancing weight causing the balancing weight to be released from the holder and pivoted about the edge that bears against the wheel at the balancing position so that the whole adhesive layer is pressed against the wheel surface.

13 Claims, 2 Drawing Sheets

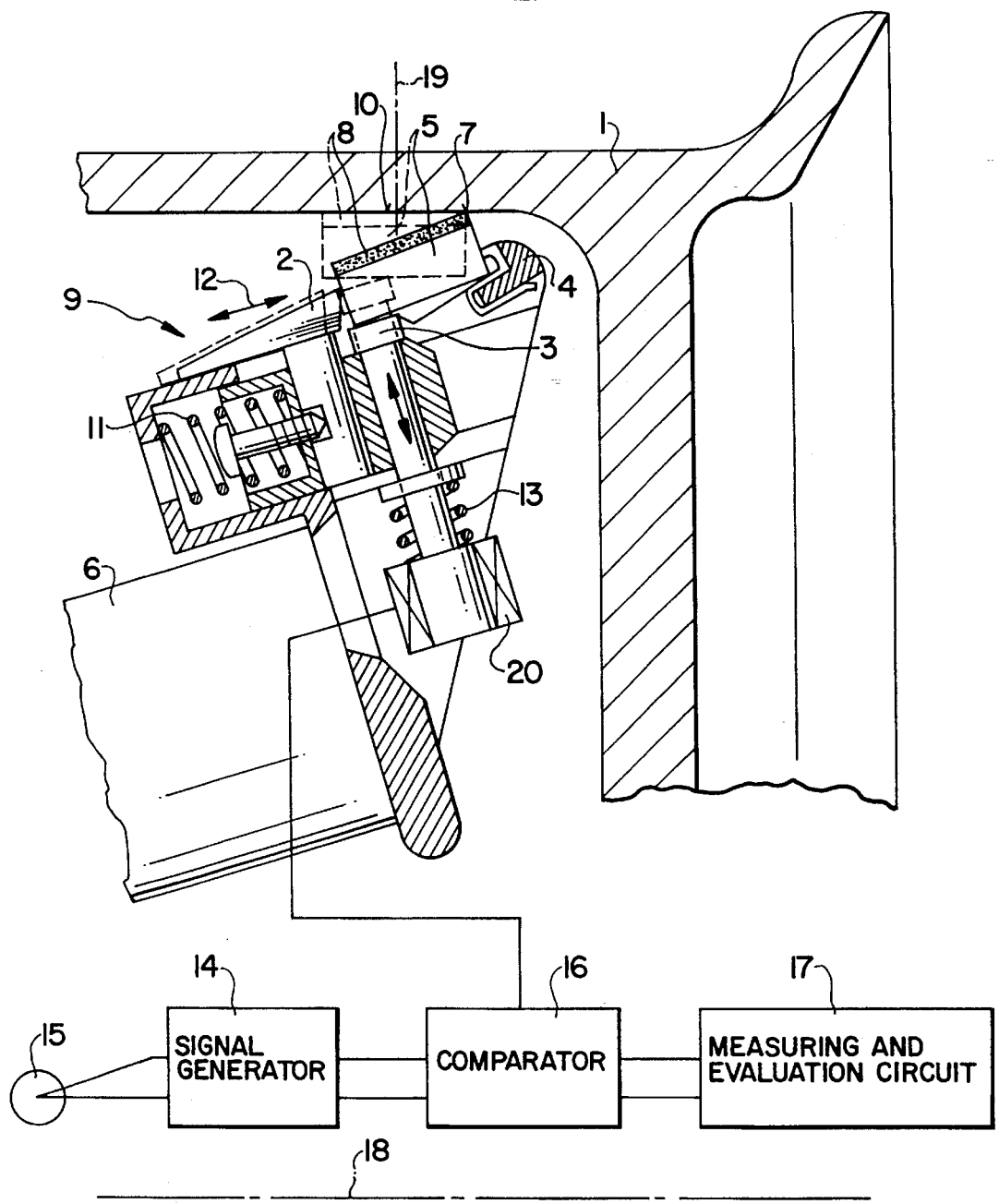

5,557,043

APPARATUS FOR FIXING AN ADHESIVE BALANCING WEIGHT TO A VEHICLE WHEEL

BACKGROUND OF THE INVENTION

It is known that motor vehicle wheels can be balanced by fixing one or more balancing weights to the wheel at one or more suitable positions thereon. A balancing weight can be fixed to a wheel by using adhesive, for which purpose the balancing weight may have an adhesive layer which is pressed firmly against the wheel to be balanced, at the appropriate balancing position. A device for carrying out that operation, as is to be found in DE 42 29 865 A1, comprises a holding arrangement having first and second holding portions for holding the balancing weight fast, under a spring force. The apparatus further includes a guide means with which the holding arrangement can be guided to the balancing position where the balancing weight with its adhesive layer thereon is to be fitted to the wheel, so that the balancing weight can thus be pressed against the wheel at the balancing position. That apparatus can be used for reliably securing self-adhesive balancing weights even to concealed locations on a vehicle wheel, more particularly on a disk wheel portion, for example at the inside thereof.

SUMMARY OF THE INVENTION

An object of the present invention is to provide an apparatus for fixing a balancing weight having an adhesive layer to a balancing position on a wheel, which can ensure that the balancing weight is securely fixed in the correct position.

Another object of the present invention is to provide an apparatus for fixing a self-adhesive balancing weight to a balancing position on a vehicle wheel disk portion, so designed to ensure that the balancing weight is released in the accurate position from means holding the balancing weight in the operation of fixing the weight to the balancing position.

Still another object of the present invention is to provide an apparatus for fixing a balancing weight by adhesive means to a balancing position on a vehicle wheel, that can provide for positioning the weight on the wheel in a highly accurate position using a simple operating movement and a simple structure.

In accordance with the present invention the foregoing and other objects are attained by an apparatus for fixing a balancing weight having an adhesive layer to a balancing position on a vehicle wheel such as a disk wheel portion, comprising a holding means having first and second holding portions for holding the balancing weight with a spring force. The apparatus further includes a guide means for guiding the holding means to the balancing position for pressing the balancing weight against the wheel at that position. The guide means is adapted to apply to the balancing position an edge at the side of the balancing weight, which is provided with an adhesive layer thereon. The balancing weight can then be released from the holding means by pressure which is directed towards the balancing position and which is applied to the balancing weight, the balancing weight thereby being pivotable about its said edge which bears against the balancing position for the adhesive layer on the weight to be pressed thereagainst.

The pressure required for releasing the balancing weight from the holding means and for pressing it with the adhesive layer against the balancing position can be manually or automatically applied and transmitted to the balancing weight when the balancing weight bears against the balancing position with its above-mentioned edge.

The fact that the balancing weight is caused to tilt about the edge which is firstly caused to bear against the balancing position, at the side of the balancing weight at which the adhesive layer is disposed thereon, and the balancing weight is released from the holding means when that tilting movement occurs, provides for a simple transition of the balancing weight from its position in which it is held fast in the holding means, to the balancing position. The edge of the balancing weight, which initially bears against the wheel at the balancing position and about which the balancing weight then tips or tilts provides that the balancing weight remains in its accurate position into which it has been moved by operation of the guide means, when it undergoes that transfer from the holding means on to the vehicle wheel at the balancing position thereon.

It will be noted at this point that the surface of the balancing position may extend parallel or inclinedly relative to the axis of rotation of the wheel to which the weight is to be fitted.

Preferably at least one of the two holding portions of the holding means is adapted to be movable, in which case, when the pressure is applied to the balancing weight to cause it to bear against the wheel at the balancing position, that movable holding portion is pivoted into a position of releasing the balancing weight.

In a preferred feature of the invention the weight-applying pressure can be applied to the surface of the balancing weight which is remote from the adhesive layer, by a pressure means which is still more preferably in the form of a displaceable pressure pin.

In accordance with a preferred feature of the invention the guide means can be in the form of a telescopic bar which is movably connected to the structure of a balancing machine. A guide means of that kind is to be found in DE 42 29 865 A1 corresponding to U.S. Ser. No. 08/115779 (U.S. Pat. No. 5,471,874) in conjunction with DE 41 22 844 A1 corresponding to U.S. Ser. No. 07/910917 (U.S. Pat. No. 5,449, 064 ) to which reference is therefore directed.

The holding means is preferably fixed to the free end of the guide means which is preferably in the form of bar. By virtue of such a guide means the holding means and the balancing weight carried thereby can be moved in a defined manner to the desired balancing position on the vehicle wheel, being the position which for example was ascertained during a measuring operation, as is described in detail in above-indicated DE 42 29 865 A1 corresponding to U.S. Ser. No. 08/115779 (U.S. Pat. No. 5,471,874).

Further objects, features and advantages of the present invention will be apparent from the following description of preferred embodiments thereof.

BRIEF DESCRIPTION OF THE DRAWING

FIG. 2 is a corresponding view of a second embodiment.

DESCRIPTION OF PREFERRED EMBODIMENTS

Figure 1:
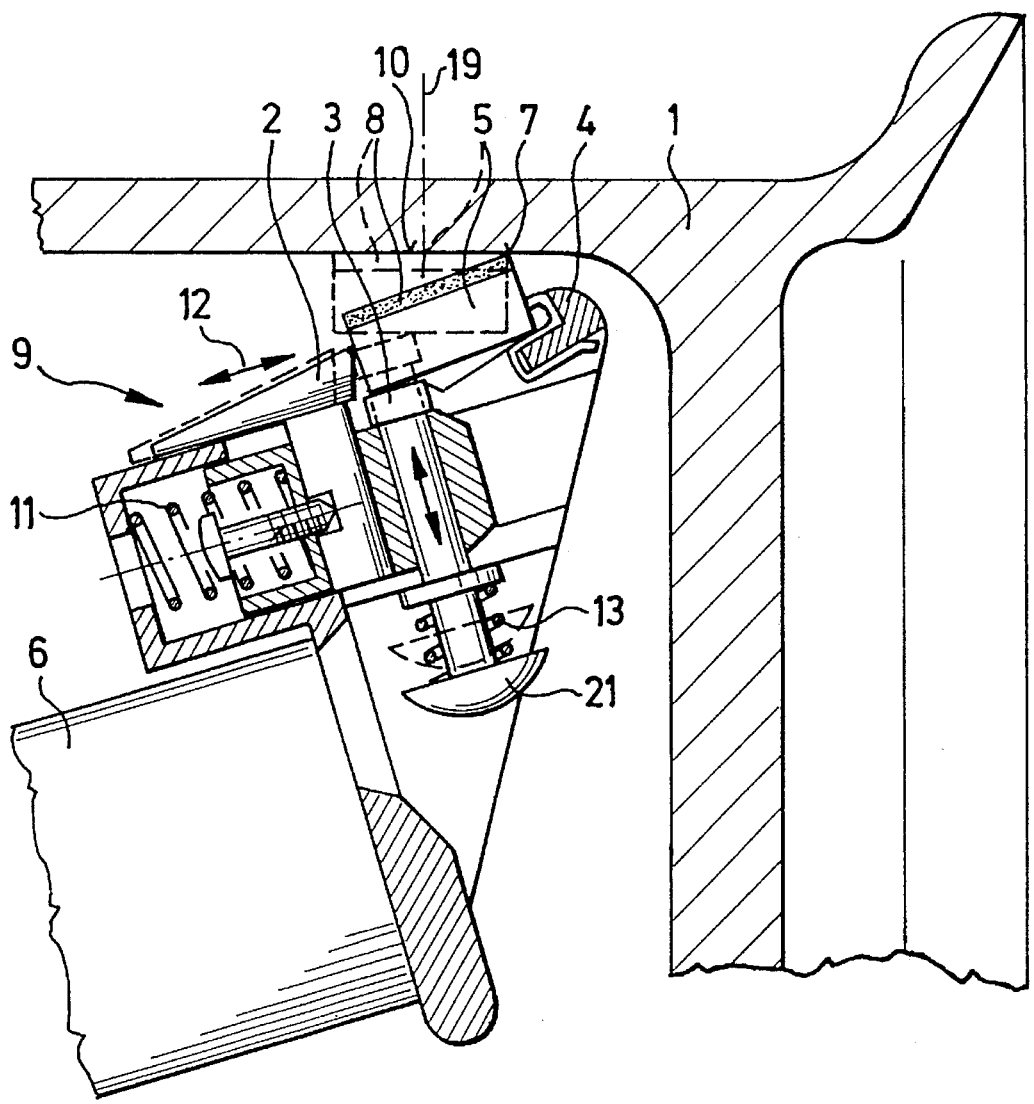
FIG. 1 is a partly sectional side view of a first embodiment of the apparatus according to the invention.

Referring generally to the accompanying drawings shown therein are sectional views of embodiments of the apparatus according to the invention for fixing a balancing weight having an adhesive layer thereon to a motor vehicle wheel at a disk wheel portion thereof at a suitable balancing position thereon. The drawings show a part of a disk wheel as indicated at 1. The apparatus includes a holding means 9 fixed to the free end of a guide means 6 in the form of a telescopic bar, as described in the above-mentioned patents to which attention is therefore directed. With the illustrated arrangement a balancing weight as indicated diagrammatically at 5 can be moved to a concealed or masked balancing position 10 in a balancing plane 19 of the disk wheel 1, as is shown in for example FIG. 1. The balancing weight 5 is held in the holding means 9 in the position shown in solid lines. It will be seen that the holding means 9 comprises first and second holding portions respectively indicated at 2 and 4. The balancing weight 5 is held between the holding portions 2 and 4 under a spring force. The spring biasing force is applied by a compression coil spring 11 which acts on the holding portion 2 which is in the form of a holding claw. The holding portion 2 is mounted on the body of the holding means 9 displaceably relative thereto, as indicated by the double-headed arrow 12 in both FIGS. 1 and 2. The direction indicated by the double-headed arrow 12, and thus the displaceability of the holding portion 2, is parallel to the direction of telescopic movement of the telescopic bar constituting the guide means 6.

The other holding portion 4 against which the balancing weight 5 is pressed in the holding means 6 by the force of the spring 11 by way of the holding portion 2 can be in the form of a fixed abutment member or in the form of a holding spring member.

The apparatus further includes, on the holding means 9, a pressure-transmitting means 3 which in the illustrated embodiments is formed by a pressure pin with a press knob 21, the pin being displaceable perpendicularly to the direction of displacement of the holding portion 2. As FIG. 1 shows the pin can be pressed by hand against the force of a spring 13 towards and against a surface of the balancing weight 5 which is held in the holding means 9, being the surface which is disposed on the other side of the balancing weight 5 from a surface which is an adhesive surface or which carries an adhesive layer thereon, as indicated at 8.

In order to fix the balancing weight 5 to the disk wheel 1 at the balancing position 10, the holding means 9 and the balancing weight 5 fixed therein are moved to the appropriate balancing position 10 by operation of the guide means 6.

The balancing weight 5 is applied against the disk wheel 1 at the balancing position 10 by way of an edge 7 of the balancing weight 5, being an edge disposed at the side at which the adhesive layer 8 is disposed on the balancing weight 5. A pressure is applied to the balancing weight 5 by hand against the force of the spring 13, by way of the pressure-transmitting means 3 in the form of a pin, so that the balancing weight 5 pivots about the edge 7 which bears against the disk wheel 1, and thus the adhesive surface 8 of the balancing weight 5 is caused to bear against the adjacent surface of the disk wheel 1 at the balancing position 10. In that phase of operation the pin constituting the pressure-transmitting means 3 is moved into the position shown in broken line and the balancing weight 5 moves into the position which is also shown in broken line.

In that case the holding portion 2 is displaced perpendicularly to the edge 7 into a release position which is also shown in broken line, to release the balancing weight 5.

It is also possible for the balancing weight 5 to be tilted about the edge 7 out of its position in which it is held in the holding means 9, by the application of pressure to the holding means 9, without the apparatus including an additional pressure-transmitting means as indicated at 3 in FIGS. 1 and 2, in the form of a pin, so that as a result the balancing weight 5 comes to bear against the surface of the disk wheel 1 at the balancing position 10 with the whole of its adhesive surface 8, as is shown in broken lines in the drawing. It will be noted however that the inclusion of the pressure-transmitting means which acts on the side of the balancing weight 5 which is opposite to the adhesive surface 8 thereof provides for improved positioning of the balancing weight in moving from the position in which it is held in the holding means 9 into the position in which it is fixed to the disk wheel 1 at the balancing position 10. If the holding portion 4 is in the form of a holding spring member, tilting movement of the balancing weight 5 about its edge 7 is made still easier.

In the embodiment shown in FIG. 2 the pressure is applied to the balancing weight 5 by an automatic actuating device. That pressure is produced when the weight is applied to the balancing position 10, for example at the edge 7 of the weight, as is shown in FIG. 2. In the embodiment illustrated in FIG. 2 the automatic actuating device includes an actuating solenoid 20. When the solenoid 20 is switched on the pressure-transmitting means 3 which is in the form of a displaceable pin is pushed upwardly in FIG. 2 against the force of the coil spring 13 so that the whole of the adhesive surface 8 of the balancing weight 5 is pressed against the disk wheel 1 at the balancing position 10.

The solenoid can be switched on for example by a foot switch (not shown) when the balancing weight has been moved to the balancing position 10 in the balancing plane 19 and, as is described in above-mentioned DE 42 29 865 A1 corresponding to U.S. Ser. No. 08/115779 (U.S. Pat. No. 5,471,874), a suitable signal indicates that the balancing weight 5 is in the balancing plane 19 and at the balancing position 10.

It is however also possible for the solenoid 20 to be switched on automatically when the telescopic guide means 6 and the balancing weight 5 carried thereby have moved into the position shown in FIG. 2. For that purpose the apparatus may have a measuring transducer 15 which generates electrical signals in dependence on the angle assumed by the telescopic guide means 6 relative to an axis as indicated at 18 in FIG. 2 of the disk wheel 1, and the extension length of the telescopic guide means 6. A signal generator 14 is connected to the measuring transducer 15 and passes a signal in respect of angle and extension length to a comparator 16, in accordance with the angular position and the extension length of the telescopic guide means 6. When the angle and extension signal correspond to the balancing plane 19 and the radius of the measuring location which constitutes the balancing position 10 about the axis of the disk wheel 1, which are stored in a measuring and evaluation circuit 17, the solenoid 20 is automatically switched on. In that situation the comparator 16 produces a switch-on signal for actuation of the solenoid 20.

Instead of the solenoid 20 which acts directly on the pressure-transmitting means 3 the apparatus may have a capacitively or inductively actuated slider which is movable transversely to the direction of movement of the pressure-transmitting means 3, that is to say in the line of longitudinal extension of the guide means 6, and which acts by way of an inclined surface on the press knob 21 shown in FIG. 1 on the pressure-transmitting means 3 formed by the displaceable pin.

It will be appreciated that the above-described embodiments of the present invention have been set forth solely by way of example and illustration of the principles of the invention and that various modifications and alterations may be made therein without thereby departing from the spirit and scope of the invention.

What is claimed is:

1. Apparatus for fixing a balancing weight having an adhesive layer to a vehicle wheel at a balancing position comprising a balancing weight holder fixed to an end of a movable guide member, said holder having at least first and second holding portions one of which is biased toward the other to hold a balancing weight therebetween so that movement of said guide member moves said balancing weight to the balancing position, said balancing weight having an edge at the adhesive-bearing side of the balancing weight against the wheel at the balancing position, and means for applying pressure to the balancing weight at a position remove from said edge to pivot said balancing weight about said edge towards the balancing position whereby the balancing weight is released from said holder and into adhesive engagement against the wheel at the balancing position.

2. Apparatus as set forth in claim 1 wherein said pressure-applying means is at least a part of said holder means.

3. Apparatus as set forth in claim 1 wherein said pressure-applying means is operable manually.

4. Apparatus as set forth in claim 1 wherein said pressure-applying means is an automatic actuating means.

5. Apparatus as set forth in claim 1 wherein at least one of the first and second holding portions is movable perpendicularly relative to said edge.

6. Apparatus as set forth in claim 5 wherein the at least one movable holding portion is displaceable into a position of releasing said balancing weight by the pressure applied to said balancing weight.

7. Apparatus as set forth in claim 5 wherein the pressure-applying means comprises a force-transmitting means mounted to said holder to engage a surface of said balancing weight which is in opposite relationship to the adhesive layer and wherein the at least one movable holding portion is movable by the force-transmitting means into the position of releasing said balancing weight.

8. Apparatus as set forth in claim 1 wherein the pressure-applying means comprises a force-transmitting means mounted to said holder to engage a surface of said balancing weight which is in opposite relationship to the adhesive layer.

9. Apparatus as set forth in claim 8 wherein the pressure-transmitting means is in the form of a pressure pin which is displaceable by hand transversely to said balancing weight held in said holder.

10. Apparatus as set forth in claim 1 wherein said movable guide member is movably connected to the structure of a balancing machine.

11. Apparatus as set forth in claim 1 wherein said movable guide member is in the form of a telescopic bar.

12. Apparatus as set forth in claim 11 wherein said holder is carried at a free end of said movable guide member.

13. In a balancing machine for a vehicle wheel apparatus for fixing at least one balancing weight having an adhesive thereon to the wheel at a balancing position comprising a holder fixed to an end of a guide member movably mounted to said balancing machine, said holder having at least first and second holding portions one of which is biased toward the other to hold a balancing weight therebetween with a spring stress, whereby movement of said guide member locates said balancing weight in a balancing position on said wheel so that an edge of said balancing weight at the adhesive-bearing side of the balancing weight engages said wheel at the balancing position, and means for applying a pressure to said balancing weight at a point remote from said edge to pivot said balancing weight about said edge towards the balancing position whereby the balancing weight is released from said holder and into adhesive contact against the wheel at the balancing position.

\* \* \* \* \*